United States Patent [19]

Simpson, III

[11] Patent Number: 4,759,680
[45] Date of Patent: Jul. 26, 1988

[54] APPARATUS FOR SEPARATING A CROP FROM A CONTINUOUS TRAY

[76] Inventor: Leland S. Simpson, III, 4275 N. Chateu Fresno, Fresno, Calif. 93711

[21] Appl. No.: 857,296

[22] Filed: Apr. 29, 1986

[51] Int. Cl.⁴ .................. B56G 65/23; B56G 67/08
[52] U.S. Cl. .................. 414/418; 56/327.1; 56/328.1; 414/406; 414/787; 198/314; 198/586
[58] Field of Search ............ 419/406, 418, 403, 415, 419/404, 501; 56/327 R, 327 A, DIG. 2, 27.5

[56] References Cited

U.S. PATENT DOCUMENTS

| | | | |
|---|---|---|---|
| 2,670,863 | 3/1954 | Stanley | 414/418 X |
| 2,821,314 | 1/1958 | Gibbons et al. | 414/418 |
| 2,936,917 | 5/1960 | Musgrave | 414/418 |
| 3,280,995 | 10/1966 | Barkley | 414/418 X |
| 3,606,723 | 9/1971 | Clark | 56/27.5 X |
| 3,701,241 | 10/1972 | Zuckerman | 56/327 A |
| 3,795,335 | 3/1974 | Hansen, Jr. | 414/406 X |
| 3,955,343 | 5/1976 | Tico | 414/403 X |
| 4,221,665 | 9/1980 | Decker | 414/403 X |

Primary Examiner—Kenneth J. Dorner
Attorney, Agent, or Firm—Worrel & Worrel

[57] ABSTRACT

An apparatus for separating a crop from a continuous tray. The apparatus includes a first conveyor which engages and transports a continuous tray which has disposed thereon a crop to be harvested into contact with a second conveyor. The second conveyor engages and inverts the continous tray to dislodge the crop disposed thereon. A third conveyor is disposed in receiving relation to the second conveyor and collects the dislodged crop and moves it to a collection point.

13 Claims, 8 Drawing Sheets

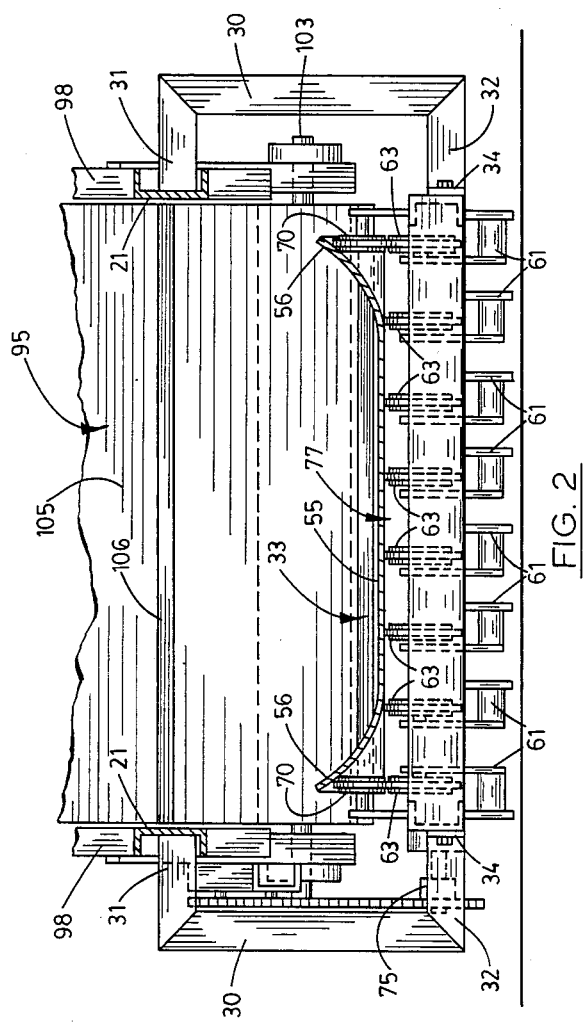
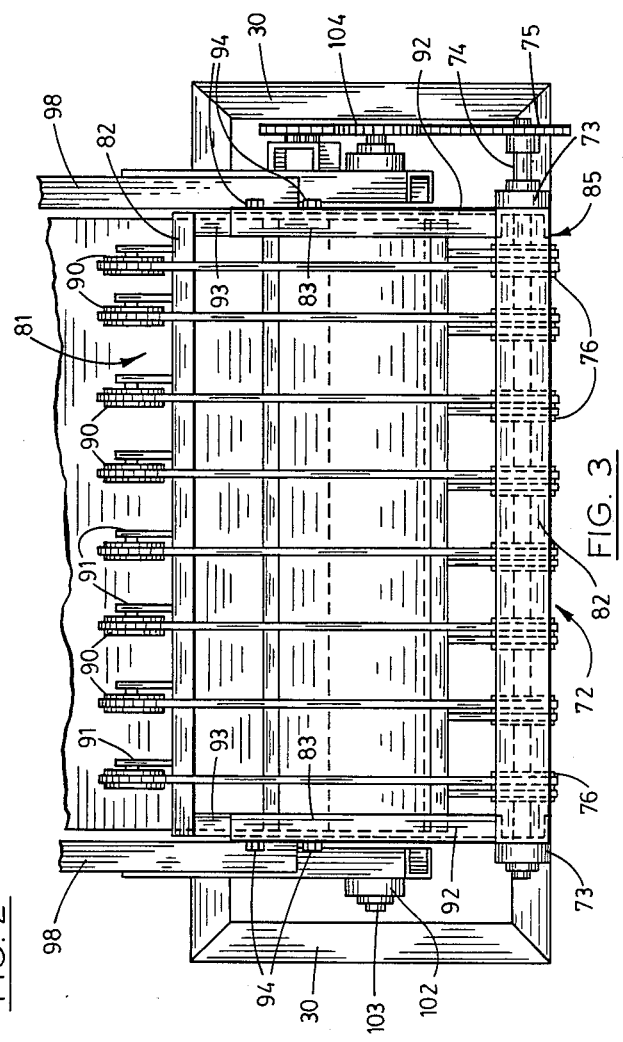

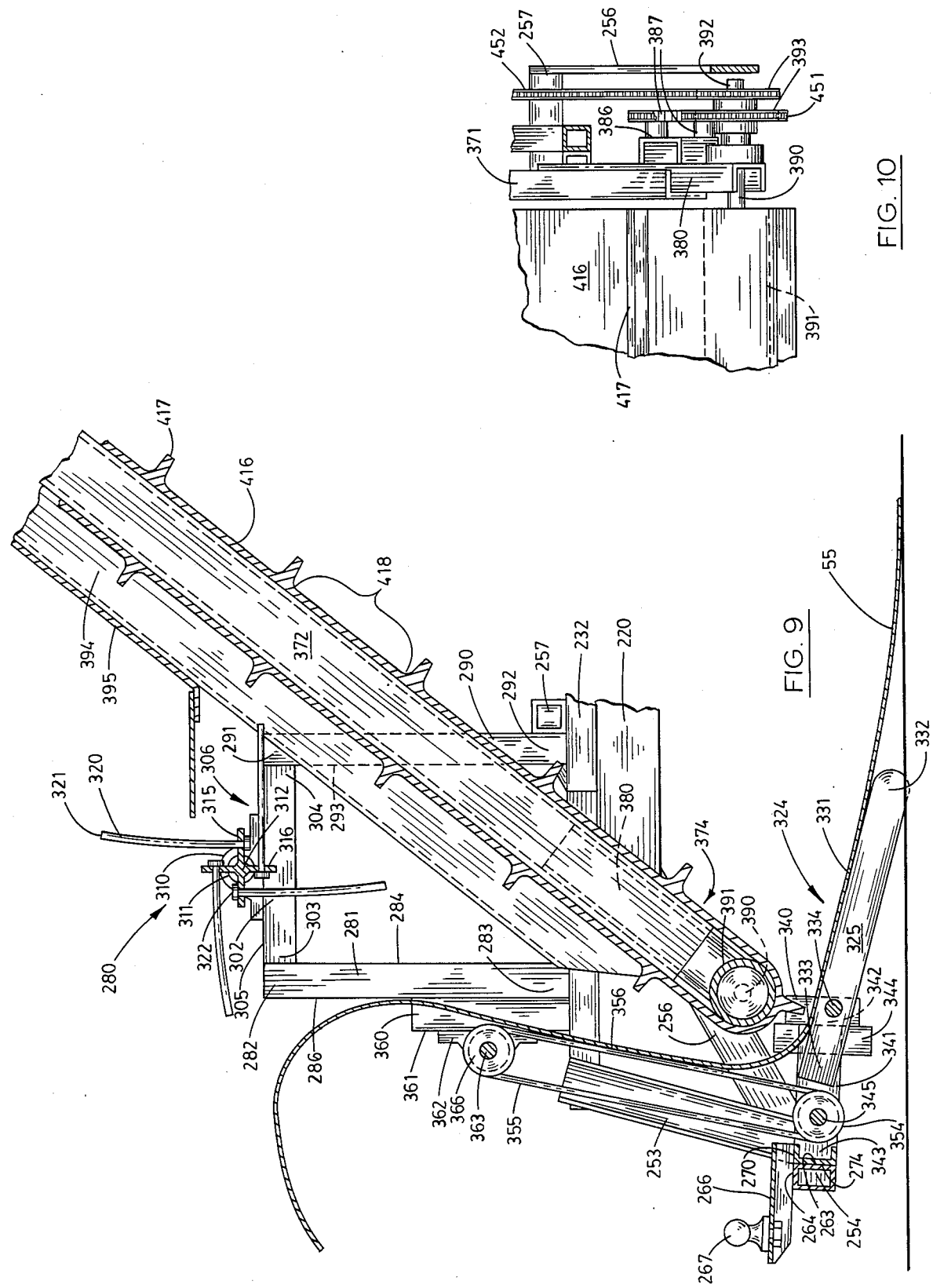

APPARATUS FOR SEPARATING A CROP FROM A CONTINUOUS TRAY

BACKGROUND OF THE INVENTION

1. Field of the Invention.

The present invention relates to an apparatus for separating a crop from a continuous tray, and more particularly to an apparatus operable to collect a harvested row crop, wherein, a continuous tray, which has the crop disposed thereon, is placed in a first attitude and moved to engagement with a conveyor means which inverts the continuous tray to dislodge the crop disposed thereon, and thus places the continuous tray in a second attitude. The dislodged crop is then moved by suitable conveyor means to a collection point. The apparatus herein described has particular utility in the separation of raisins from a continuous tray.

2. Description of the Prior Art.

In the production of raisins from grapes, the grapes are generally picked by manual laborers and are thereafter commonly placed on long, continuous trays in an advantageous position between the rows of the vineyard for drying. The grapes are then permitted to stand, while the rays of the sun transform the grapes into raisins. In other cases, the grapes may be sprayed with a solution, such as methyloleate, which substantially removes the waxy outer coating that protects the fruit from the sun. The grapes are then permitted to sun dry on the vine and are then harvested. In some instances the vine dried raisins are placed on a continuous tray for further curing prior to collection. The foregoing are among the most common processes currently in use for the production of raisins.

The direct labor and equipment costs that are necessary to separate and collect the raisins from a continuous tray are substantial. A variety of apparatuses have been developed and used over the years for this purpose. As should be understood, apparatuses adapted to separate row crops and particularly raisins from continuous trays are quite expensive to purchase, and likewise costly to maintain. For the small vineyard owner, such harvesting apparatuses are not cost effective to purchase. However, the alternative of incurring the direct labor expenses may place a vineyard owner's crop of raisins in a less advantageous market position with that of their competitors. As of late, recent bumper harvests of grapes have resulted in a glut of raisins on the market and, as could be expected, this raisin glut has resulted in a continuing decrease in the price which raisins bring at market. Consequently, raisin producers have continually sought to reduce their operating expenses to protect their respective profit margins.

The purchase price and maintenance expenses of conventionally manufactured apparatuses adapted to collect a crop which is disposed on a continuous tray can constitute an extraordinarily great portion of the overall operating costs of a farming operation.

Therefore, it has long been recognized that it would be desirable to have an apparatus that could be manufactured at a comparatively moderate price, well within the reach of even the small farming operation, but would in turn be simple in design, easy to maintain, and be fully effective in collecting the crop from the continuous tray.

SUMMARY OF THE INVENTION

It is therefore an object of the present invention to provide an improved apparatus for separating a crop from a continuous tray.

Another object is to provide such an apparatus which is particularly well adapted for engaging a continuous tray, which has disposed thereon a crop to be harvested, and thereafter dislodging, collecting and moving the harvested crop to a suitable collection point.

Another object is to provide such an apparatus which is particularly well adapted to concentrate a crop to be harvested in substantially the central portion of a continuous tray, even if the apparatus is maneuvered off-center over the continuous tray.

Another object is to provide such an apparatus which is operable to transport the crop dislodged from the continuous tray to an adjacent row of the area being harvested for deposit into suitable collection receptacles.

Another object is to provide such an apparatus which is of comparatively moderate cost to manufacture and maintain.

Further objects and advantages are to provide improved elements and arrangements thereof for an apparatus for the purposes intended which is dependable, economical, durable and fully effective in accomplishing its intended purposes.

These and other objects and advantages are achieved in an apparatus adapted for separating a crop from a continuous tray having a first conveyor means which engages and permits the movement of the continuous tray to contact with a second conveyor means; the second conveyor means, upon contact, inverts the continuous tray to dislodge the crop which is disposed thereon; and a third conveyor means collects the dislodged crop and moves the crop to a suitable collection point.

BRIEF DESCRIPTION OF THE DRAWINGS

FIG. 2 is a somewhat enlarged, fragmentary, transverse, vertical section taken on line 2—2 in FIG. 1.

FIG. 3 is a somewhat enlarged, fragmentary, transverse, substantially vertical section taken on line 3—3 in FIG. 1.

FIG. 9 is a somewhat enlarged, fragmentary, vertical section of the second form of the invention taken through line 9—9 of FIG. 8.

FIG. 10 is a somewhat enlarged, transverse, vertical section taken on line 10—10 in FIG. 7.

DESCRIPTION OF THE PREFERRED EMBODIMENTS

First Form

Figure 1:
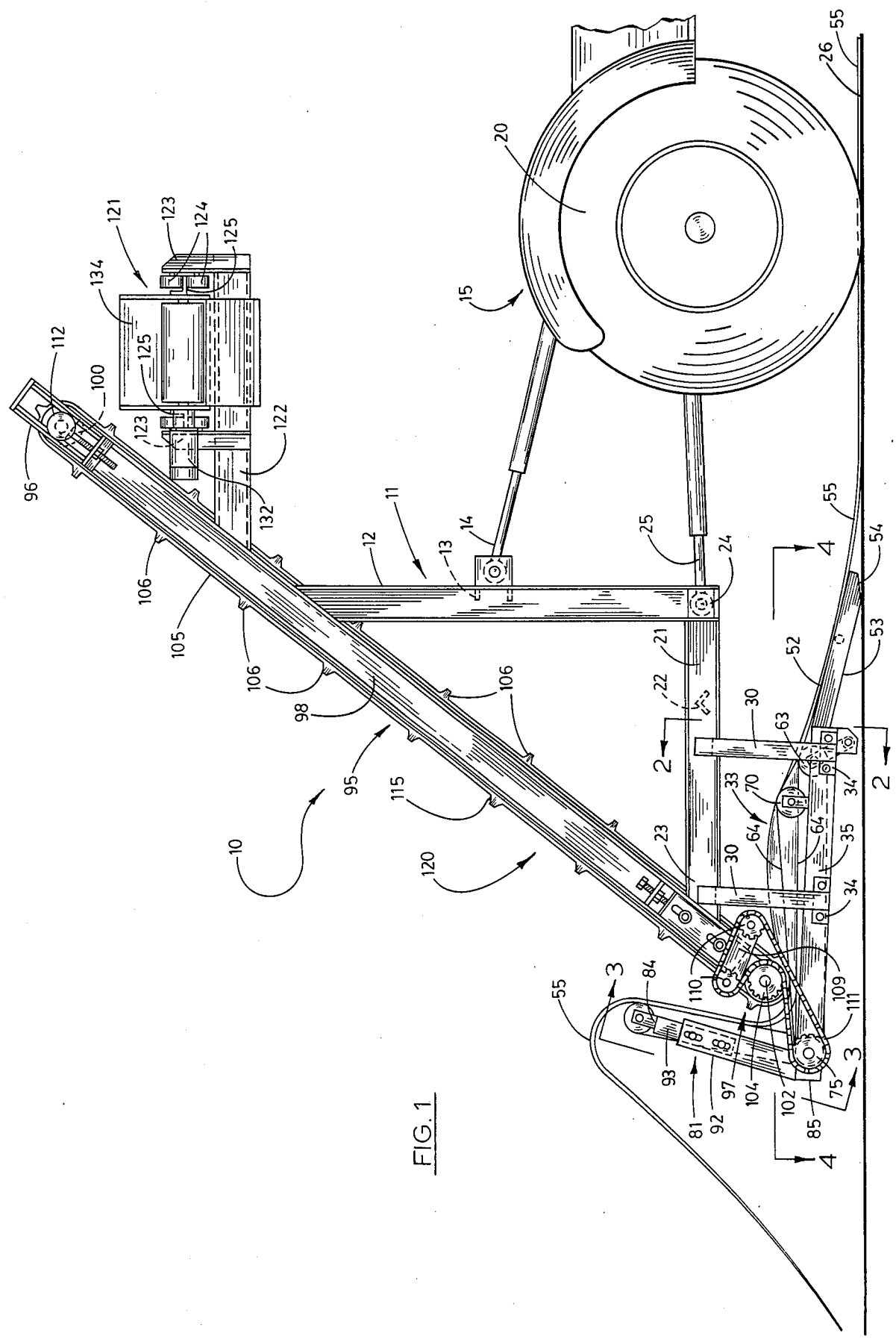
FIG. 1 is a side elevation of the first form of the apparatus shown in a typical operative environment.

Referring more particularly to the drawings, the first form of the apparatus for separating a crop from a continuous tray is generally indicated by the numeral 10 in FIG. 1. As will hereinafter be discussed in greater detail, the apparatus 10 is adapted for movement between adjoining rows of a row crop, not shown, which can best be visualized upon reference to FIG. 1. For illustrative convenience only, the row crop described herein is rows of grapevines and the crop disposed upon the continuous tray is bunches of grapes, which have been placed there for purposes of drying to produce raisins. However, it should be understood that the apparatus 10 can be employed for harvesting a wide variety of types of crops disposed on a continuous tray. Moreover, one skilled in the art should appreciate that the apparatus can be employed in combination with other types of vehicles, and can, of course, itself be manufactured in a self-propelled configuration.

The apparatus 10 has a main frame or chassis, generally indicated by the numeral 11. This main frame has two vertical, substantially parallel support members 12, as best shown in FIG. 1. The support members are held in spaced relationship by a horizontal bracing member 13, which is adapted to receive centrally thereof and hold for pivotal motion the end of a linking arm 14 which is extended from the rear of a suitable conventional tractor 15 shown fragmentarily in FIG. 1. The tractor has ground-engaging wheels 20, one of which is visible in FIG. 1, and the tractor is operable to transport the apparatus 10 in a direction of travel from left to right as viewed in FIG. 1. The attachment of the linking arm, which permits pivotal motion, is accomplished by a means familiar to those skilled in the art.

The apparatus 10 has two horizontal, substantially parallel support members 21. These support members are held in spaced relationship, by a second bracing member 22, to which they are affixed by a suitable weld. The support members have corresponding first ends 23 and opposite, second ends 24. The second end of each support member is attached to the support member 12 on its respective side of the apparatus. The second end of each support member is adapted to receive and hold for pivotal motion the end of a linking arm 25, which, with linking arm 14, comprise a standard three-point hitch system which is familiar to those skilled in the art. The operation of this conventional three-point hitch system is not critical to the understanding of this invention. For the sake of brevity, therefore, the description of its functioning is excluded from this application. However, it should be appreciated that the three-point hitch system operates hydraulically to deploy the apparatus 10 in an appropriate operational attitude with respect to the earth surface 26, over which it travels, so that the apparatus can perform its intended objectives.

Mounted on the support members 21 are four hanger members 30, two mounted respectively on each support member. The hanger members 30 have first ends 31 affixed on their respective support members by a suitable weld. The hanger members have second ends 32 which are individually mounted on and thereby support in depending relation a first conveyor 33. The second end of each hanger member is attached to the first conveyor by a suitable mounting bracket 34. As clearly illustrated in FIG. 1, the hanger members deploy the first conveyor 33 in fixed, spaced relationship to the support members 21.

Figure 4:
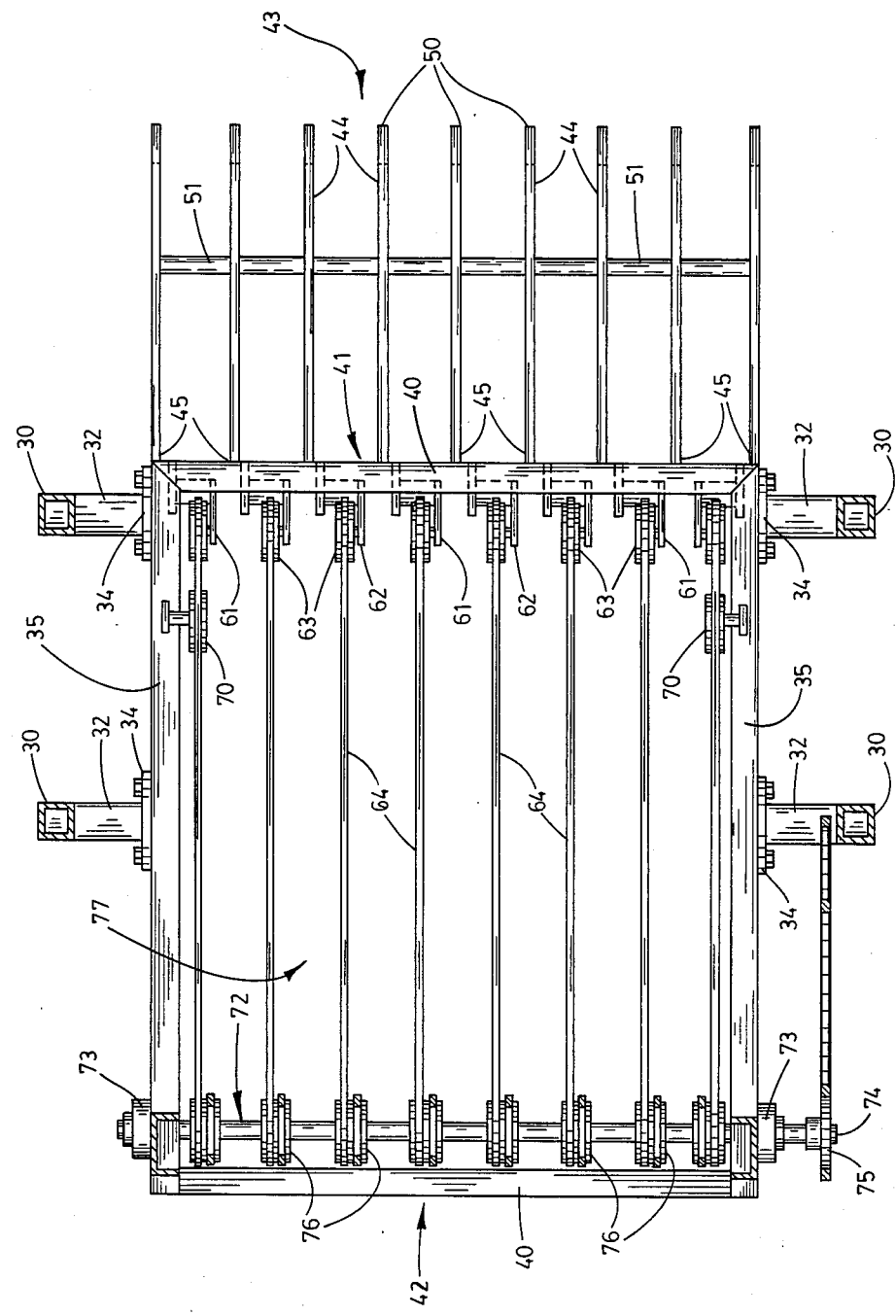
FIG. 4 is a somewhat enlarged, fragmentary, horizontal section taken on line 4—4 in FIG. 1

As best depicted in FIG. 4, the first conveyor 33 has two parallel, longitudinal frame members 35 interconnected by two transverse frame members 40, mounted on, and extending in spaced, substantially parallel relation between the longitudinal frame members. The longitudinal and transverse frame members are preferably channel members. The first conveyor has a leading portion 41 and an opposite, trailing portion 42 relative to its intended direction of travel, which is from left to right as viewed in FIG. 4.

A tray-engagement ramp 43 is mounted on the leading portion of the first conveyor 33. The tray-engagement ramp 43 is composed of a plenary number of spaced, substantially parallel ribs 44. The ribs have respectively first ends 45 and opposite second ends 50. The first end of each rib is affixed by a suitable weld on the transverse frame member 40 which is positioned at the leading portion 41 of the first conveyor 33. The spaced, substantially parallel ribs are held in fixed relationship by a bracing member 51 to which they are appropriately welded. As best illustrated in FIG. 1, the ribs have first surfaces 52 and opposite second surfaces 53. As visible in FIG. 1, a portion of the second surface of each rib is tapered in configuration, and is indicated generally in FIG. 1 by the numeral 54. The tapered configurations of the second surfaces of the ribs facilitate the movement of the tray-engagement ramp 43 under the continuous tray 55 and over the surface of the earth 26. The deployed attitude of the tray-engagement ramp as illustrated, permits the movement of the continuous tray up the tray-engagement ramp and into contact with the first conveyor 33. The continuous tray has peripheral or lateral edges 56.

To engage the continuous tray 55 with the apparatus 10 requires an initial adjustment of the hydraulic system of the tractor which, in turn, causes the activation of the adjustable three-point hitch system, consisting of linking arms 14 and 25 to place the apparatus 10 in an advantageous operable attitude wherein the tray-engagement ramp 43 is moved to a position beneath the continuous tray 55. Once in contact with the continuous tray from beneath, the tractor is propelled forward to carry the tray-engagement ramp beneath the tray. The weight of the crop disposed on the continuous tray causes the continuous tray to slide easily up the tray-engagement ramp and into contact with the first conveyor 33. This is best illustrated and understood by reference to FIG. 1.

The transverse frame member at 40 at the leading portion 41 of the first conveyor 33 mounts, by a suitable weld, a plenary number of pulley support brackets 61 mounted on the under side of the frame member and extending upwardly and rearwardly therefrom, as best shown in FIG. 1. The pulley support brackets each have a first end 62 which is adapted to receive, and hold for rotational movement, a first rotatably mounted pulley 63. The first pulleys are of conventional design adapted to receive and hold a conventionally configured V-shaped belt 64 entrained thereon. Each V-shaped belt is continuous and is triangularly shaped in cross-section to travel in a notch formed in and circumscribing its respective first pulley.

A pair of idler pulleys 70 are individually mounted on the upper surfaces of the longitudinal frame members 35. The idler pulleys are located in positions closely adjacent to the transverse member 40 at the leading portion 41 of the first conveyor, but project upwardly therefrom and from the first pulleys 63. The idler pulleys are deployed to cause the peripheral edges 56 of the continuous tray 55 to be elevated relative to the central portion thereof. As can best be seen by reference to FIG. 2, the V-belts 64 which are deployed on and about the idler pulleys causes the crop disposed on the continuous tray 55 to be concentrated in substantially the central portion of the continuous tray. The crop slides or rolls toward the center portion of the continuous tray, thus accomplishing the concentration.

Located in a position closely adjacent to the trailing portion 42 of the first conveyor 33 is an axle assembly 72, shown in FIG. 4. The axle assembly is mounted in spaced relationship to the transverse member 40 at the trailing portion 42 of the first conveyor. The axle assembly includes bearings 73 which are individually mounted on the longitudinal frame members 35 and the axle is mounted for rotation freely about its longitudinal axis, in this spaced relationship. The axle assembly 72 has a first end 74 mounting a first sprocket 75.

Affixed along the axle assembly 72 is a plenary number of dual seated pulleys 76. The pulleys 76 are dual seated in that they each have a pair of notches extending thereabout in side-by-side relation. The notches of each pulley 76 are fixed relative to each other so that motion applied to one of the notches by a V-belt entrained therein is transferred to the V-belt entrained in the other notch, as will hereinafter be described. The dual seated pulleys as illustrated are deployed in substantially equidistant spaced relationship along the length of the axle assembly in individual alignment with the first pulleys 63. The dual heated pulleys are adapted individually to receive the free portions of the V-belts 64 and other V-belts hereinafter to be discussed. This is perhaps best illustrated in FIG. 3. The dual seated pulleys are advantageously positioned such that they are in substantial alignment with the first pulleys 63 so that the V-belts 64 individually extend under tension therebetween and about the dual seated pulleys and the first pulleys 63. The deployment of the V-belts in such a fashion defines a supporting surface 77 for the continuous tray 55 to be transported on. The supporting surface has raised lateral edges adjacent to the leading portion 41 of the first conveyor as a result of the idler pulleys 70.

A second conveyor 81 has two horizontal support beams 82 which are held in spaced, substantially parallel relation by two vertical support beams 83. The horizontal and vertical support beams are interconnected by suitable welds thus forming a rigid, rectangular frame. The second conveyor means has an upper or first end 84 and an opposite lower or second end 85. The second end 85 is mounted by a suitable weld on the transverse frame member 40 which is positioned at the trailing portion 42 of the first conveyor 33. The second conveyor is deployed in fixed relationship to the trailing portion of the first conveyor and is disposed at an angle of somewhat less than 90° relative thereto, as can best be visualized in FIG. 1, so that the continuous tray, transported from the first to the second conveyor as will hereinafter be described in greater detail, is carried into an angle relative to itself of greater than 90° and preferably about 110°.

Mounted on the first end 84 of the second conveyor 81 are a plurality of second rotatably mounted pulleys 90. The second pulleys 90 are held in fixed, spaced relationship from the first end 84 by pulley support brackets 91. The second pulleys are individually positioned in substantial alignment with the dual seated pulleys 76 of the axle assembly 72, as can best be seen in FIG. 3. V-belts 64 are individually extended about the second pulleys and the available notches of the dual seated pulleys and are under tension. The deployment of the V-belts in this fashion is operable to simultaneously lift, invert and change the direction of movement of the continuous tray 55 as shown in FIG. 1.

As best depicted by reference to FIG. 3, the vertical support beams 83 are each composed of a first element 92, mounted on the transverse frame member 40, and a second element 93. The second element 93 of each support beam is slidably mounted within the first element 92, but is firmly but releasably affixed to the first element 92 by suitable fastening means, here illustrated by bolts 94. The adjustment permitted by loosening of the bolts and repositioning of the second elements permits the first end 84 of the second conveyor 81 to be appropriately adjusted to permit the use of various length V-belts 64, and also to permit the V-belts, so deployed, to be adjusted as to tension about the dual seated pulleys 76 and the second pulleys 90.

The apparatus 10 has an elevating conveyor generally indicated by the numeral 95. As best illustrated in FIG. 1, the elevating conveyor has a lower or first end 100 and an upper or second end 101. The elevating conveyor has two major structural frame members 98 mounted on corresponding ends of support members 12 and 21, as best shown in FIG. 1. The frame members 98 are disposed in spaced substantially parallel relation and preferably at the angle with respect to horizontal shown in FIG. 1. A first axle assembly 100 interconnects the end portions of the frame members 98 at the upper end 96 of the elevating conveyor. The first axle assembly has a drive shaft 101 extending therethrough which when rotated about its longitudinal axis rotates the first axle assembly. A second axle assembly 102 interconnects the end portions of the frame members 98 at the lower end 97 of the elevating conveyor. The second axle assembly has a drive shaft 103 extending therethrough which when rotated about its longitudinal axis rotates the second axle assembly. A second sprocket 104 is secured on the end portion of the drive shaft 103 on the right as viewed in FIG. 3, in the same plane as that defined by the first sprocket 75. A belt assembly 105 is extended about the first and second axle assemblies 100 and 102 in tensioned relation so as to be rotated about the axle assemblies upon the drive shaft 101 being rotated as will hereinafter be described. A plurality of upstanding cleats 106 are mounted at suitable intervals on the belt assembly extending transversely thereof.

An idler sprocket assembly 109 is mounted on the frame member 98 on the right as viewed in FIG. 3 in close proximity to the second end 97 of the elevating conveyor 95 and mounts two idler sprockets 110 for rotational movement in the same plane as the first sprocket 75 and second sprocket 104. A drive chain 111 is mounted on and tensioned about the first sprocket 75, the second sprocket 104 and the idler sprockets 110, as shown in FIG. 1. The chain transmits force between these sprockets, one to another, as can best be visualized in FIG. 1.

Figure 5:
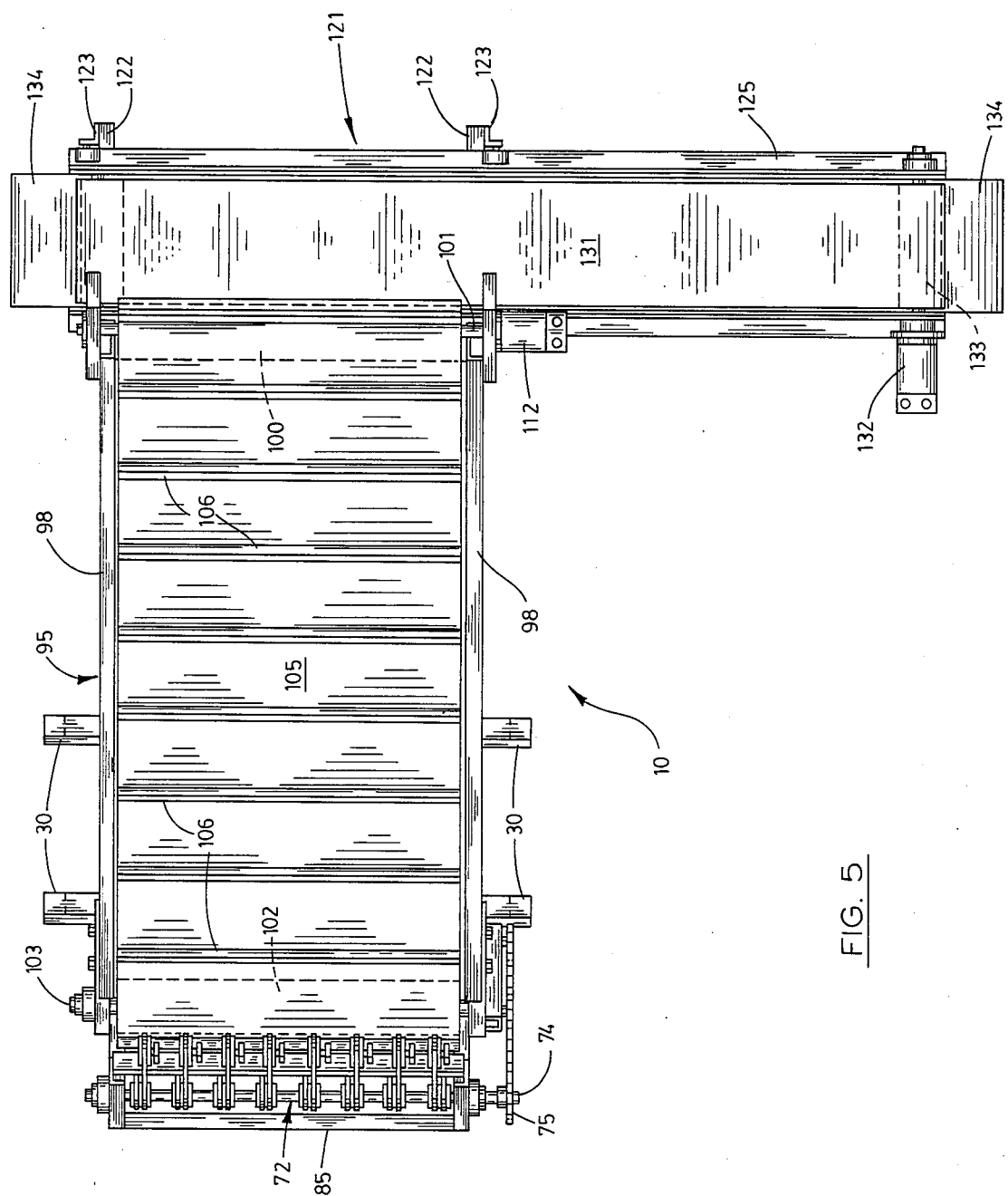
FIG. 5 is a top plan view of the first form of the subject invention.

As best seen by reference to FIGS. 1 and 5, a first hydraulic motor 112 is mounted on the frame member 98 at the first end 96 of the elevating conveyor 95. This first hydraulic motor is affixed on the frame member 98 by suitable fastening means and is connected in driving relation to drive shaft 101 of the first axle assembly 100. The first hydraulic motor is connected in driven relation to a suitable hydraulic system, not shown, such as that of the tractor 15.

Upon operation of the hydraulic system, the first hydraulic motor 112 causes the first axle assembly 100 to be rotated in a clockwise direction as viewed in FIG. 1. This, in turn, causes the belt assembly 105 to rotate in a clockwise fashion, as indicated by the arrows in FIG. 1. Such motion of the belt assembly causes the second axle assembly 102 which is located at the second end of the elevating conveyor 95 to rotate. The second sprocket 104 which is affixed to the second axle assembly 102 rotates to move the chain 111 in a generally counterclockwise direction, as viewed in FIG. 1. This rotates the first sprocket 75, which is affixed to the axle assembly 72, on which is deployed the dual seated pulleys 76. Thus, rotation of the belt assembly 105 has the overall effect of causing the V-belts 64 which are deployed about the first conveyor 33 and the second conveyor 81, to rotate in counterclockwise directions. The described configuration, as earlier discussed, permits the actuation of the first and second conveyors by the rotation of the axle assembly 72.

It should be understood from a study of FIG. 1, that the elevating conveyor 95 is held in fixed, spaced, crop-receiving relationship to the first and second conveyors 33 and 81, respectively, by the support members 12 and the support members 21 on which the elevating conveyor is mounted.

The apparatus 10 has a cross-row conveyor 121. The cross-row conveyor is designed and manufactured in a conventional configuration which is well known in the art. The cross-row conveyor is held in fixed, spaced, crop-receiving relationship to the first end 96 of the elevating conveyor 95, by two horizontal support beams 122, only one of which is visible in FIG. 1, individually mounted on the frame members 98 of the elevating conveyors 95. Suitably affixed on each of the horizontal support beams are a pair of vertical mounting brackets 123 disposed in spaced relation to each other as shown in FIG. 1. Each of the mounting brackets has a pair of rollers 124 mounted for rotational movement thereon in vertically spaced relation to each other. The rollers are of conventional design and, for the sake of brevity, are not described in detail here. A space is thus created therebetween the surfaces of the rollers of each pair. A pair of angle iron guide members 125 are mounted on opposite sides of the cross-row conveyor, as best shown in FIG. 1. The rollers of each pair are adapted to receive the extended flat portion of the guide member 125 on their respective side of the cross-row conveyor. The flat portion is slidably movable between the rollers as can best be visualized in FIG. 1. Thus, the cross-row conveyor is mounted for movement on the four sets of rollers for extension to the right or left of the first end 96 of the elevating conveyor 95. This enables the cross-row conveyor to deliver harvested crops across the top of adjoining rows of crops being harvested, to permit the crops to be collected in appropriate receptacles, such as bins or gondolas, not shown. The cross-row conveyor has a flexible conveyor belt surface 131 which is positioned below, and in crop-receiving relationship to, the first end 96 of the elevating conveyor 95. In this configuration, crops carried by the elevating conveyor are transported to the first end of the elevating conveyor and thereafter fall onto the flexible conveyor belt surface 131.

The cross-row conveyor 121 is powered by a second hydraulic motor 132 shown in FIG. 5. The hydraulic motor is mounted on the angle iron guide member 125 in driving relation to the axle assembly 133 of the cross-row conveyor. The hydraulic motor is connected to the hydraulic system for the apparatus 10 such as the tractor 15 which is towing the apparatus. The cross-row conveyor is equipped with crop deflectors 134 which are deployed in downwardly deflecting, spaced relationship from each end of the cross-row conveyor. The crop deflectors operate to urge the crop to move in a downward fashion. Moreover, the crop deflectors substantially prevent the wind from acting upon the crop as it falls from the ends of the cross-row conveyor so that the crop does not become scattered.

In operation, the cross-row conveyor 121 is positioned, either to the left or to the right, by hand, and the hydraulic motor 132 is correspondingly adjusted to cause the flexible conveyor belt surface 131 to move in the desired direction. Crops which are received on the flexible conveyor belt surface are thus transported to the desired end of the cross-row conveyor and thereafter fall into the appropriate collection receptacles therebelow.

OPERATION

First Form

The operation of the described embodiment of the first form of the subject invention is believed readily apparent and is briefly summarized at this point.

The apparatus 10 is specifically adapted for separating a harvested crop from a continuous tray 55 as, perhaps best understood by reference to FIG. 1, wherein the operation of the first conveyor 33, second conveyor 81, elevating conveyor 95 and a cross-row conveyor 121 can be visualized. The apparatus is first mounted as shown in FIG. 1 and described on linking arms 14 and 25 comprising the three-point hitch system of the tractor 15.

To initiate operation of the apparatus, the first hydraulic motor is activated, which, in turn, causes the belt assembly 105 to rotate in a clockwise fashion, as indicated by the arrows in FIG. 1. Similarly, as already described, the V-belts 64 of the first conveyor 33 and the V-belts 64 of the second conveyor 81 are driven, through the medium of chain 111, in counterclockwise directions as viewed in FIG. 1. The hydraulic motor 112 can be operated in either direction, as noted, to drive the conveyor belt surface 131 in either direction. For the sake of illustration, it will be understood that the conveyor belt surface 131 is driven in the direction of the bottom of the view in FIG. 5.

As noted, the apparatus 10 can be employed to separate virtually any crop from a continuous tray 55. However, it has particular utility in removing raisins from such a tray. To begin the separation process, the apparatus 10 is moved to an advantageous operational attitude, by utilizing the three-point hitch system composed of linking arms 14 and 25 of the tractor. The proper positioning of the apparatus causes the tray-engagement ramp 43 to be placed beneath the continuous tray 55. The weight of the crop disposed on the continuous tray has the effect of causing the continuous tray to slide easily up the tray-engagement ramp during forward movement of the tractor and into contact with the V-belts 64 of the first conveyor 33 which define the supporting surface 77 on which the continuous tray is transported.

The V-belts 64 of the first conveyor 33 engage the continuous tray 55 and move it toward the V-belts 64 of the second conveyor 81. The configuration of the first conveyor is of such that the crop borne by the continuous tray is concentrated in substantially the central portion of the continuous tray. This concentration is accomplished by elevating the peripheral edges 56 of the continuous tray by means of the idler pulleys 70 and the V-belts 64 riding thereon as already described. As can best be imagined by a study of FIG. 2, the crop which is disposed thereon is caused to be moved to the center of the continuous tray by the action of gravity and is in any event confined on the tray so as not to be lost laterally therefrom.

As the V-belts 64 of the first conveyor 33 rotate in a counterclockwise direction as viewed in FIG. 1, they carry the continuous tray 55 to engagement with the second conveyor 81. Upon contact with the second conveyor, the V-belts of the first and second conveyors simultaneously lift, invert and substantially change the direction of movement of the continuous tray by approximately 110°. The action of the second conveyor permits gravity to act upon the crop disposed on the continuous tray, thus permitting it to become dislodged. The dislodged crop falls and comes to rest in contact with the belt assembly 105 of the elevating conveyor 95. The lifting and inversion of the continuous tray is achieved in large part by the meshing or interlacing of the V-belts of the respective first and second conveyors as can be seen in FIGS. 3 and 4. The continuous tray is by this mechanism fed into the return bent configuration shown in FIG. 1 completely avoiding the possibility of the tray becoming trapped between the first and second conveyors and thus jamming the apparatus.

The elevating conveyor 95 is disposed in crop-receiving relation to the first and second conveyors 33 and 81, such that the elevating conveyor receives the dislodged crop on the upper surface of the belt assembly 105 between the cleats 106. Moreover, the cleats 106 cause the continuous tray 55 to be continually wiped at the second end 97 of the elevating conveyor thus dislodging any crop which may adhere to the continuous tray as the cleats pass in close proximity to the tray. The crop disposed on the elevating conveyor is carried upwardly in the direction of the arrows, as shown in FIG. 1, to the first end 96 of the elevating conveyor. The continuous tray, on the other hand, travels to the first end 84 of the second conveyor 81, and is thereafter discarded off the back of the apparatus 10.

Starting of the continuous tray 55 through the apparatus 10 can be achieved in any of several ways depending upon the preference of the operator and the conditions at hand. The crop can be collected by hand from the first several yards of the continuous tray at the beginning of each row and then feed the cleared portion through the apparatus as heretofore described in the manner of film through a movie projector. The apparatus is thereafter driven forwardly after which the apparatus operates as already described. It may, in some instances, be helpful to weight the free end of the tray on the earth surface 26 behind the apparatus initially to assist it in feeding through the apparatus.

Alternatively, at the beginning of each row, the apparatus 10 can be driven over the continuous tray 55 with the apparatus adjusted in the proper operational attitude. The continuous tray, as a consequence, passes up the tray-engagement ramp 43 and into contact with the first conveyor 33. As the continuous tray is carried along the first conveyor it reaches the second conveyor 81. The operator of the tractor 15 then can stop, and thereafter orient the continuous tray to cause it to pass over the first end 84 of the second conveyor 81 when movement of the tractor is resumed. Alternatively, a field worker can assist in feeding the continuous tray through the apparatus, as described, as the operator continues to drive the tractor forwardly.

However, the apparatus 10 has particular utility in that it can feed itself automatically if the tractor is simply driven over and along the continuous tray allowing the tray to feed itself through the apparatus. This simply causes the tray to thread itself along the path shown in FIG. 1 through the apparatus. While the free end of the tray may initially flop over onto the elevating conveyor 95, ultimately, whether or not this occurs, the inherent resistance of the tray to the passing wind currents will cause it to fold back into trailing relation to the apparatus as shown in FIG. 1.

The operator, after performing the foregoing, drives slowly down the row, where the continuous tray is deployed. Weighting of the free end of the continuous tray insures that the tray is maintained in contact with the V-belts 64 which are deployed about the second conveyor 81 and, additionally, the weighting insures that the tray is efficiently discarded off the back of the apparatus. The tractor is preferably driven forwardly at a speed somewhat slower than the speed of rotation of the V-belts of the first and second conveyors.

In summary, the first conveyor 33 engages and transports the continuous tray 55 bearing the crop into contact with the second conveyor 81. The second conveyor engages and inverts the continuous tray approximately 110°, thus permitting gravity to act upon, and subsequently dislodge the crop disposed thereon. The elevating conveyor 95 collects the dislodged crop and transports it to the first end 96 of the elevating conveyor, where it drops onto the conveyor belt surface 131 of the cross-row conveyor 121. The second hydraulic motor 132 drives the conveyor belt surface 131 in the preselected direction of travel. Finally, the crops disposed on the cross-row conveyor are carried to the end thereof and discharged gravitationally into collection receptacles such as bins or gondolas, not shown.

DESCRIPTION OF THE PREFERRED EMBODIMENTS

Second Form

Figure 6:
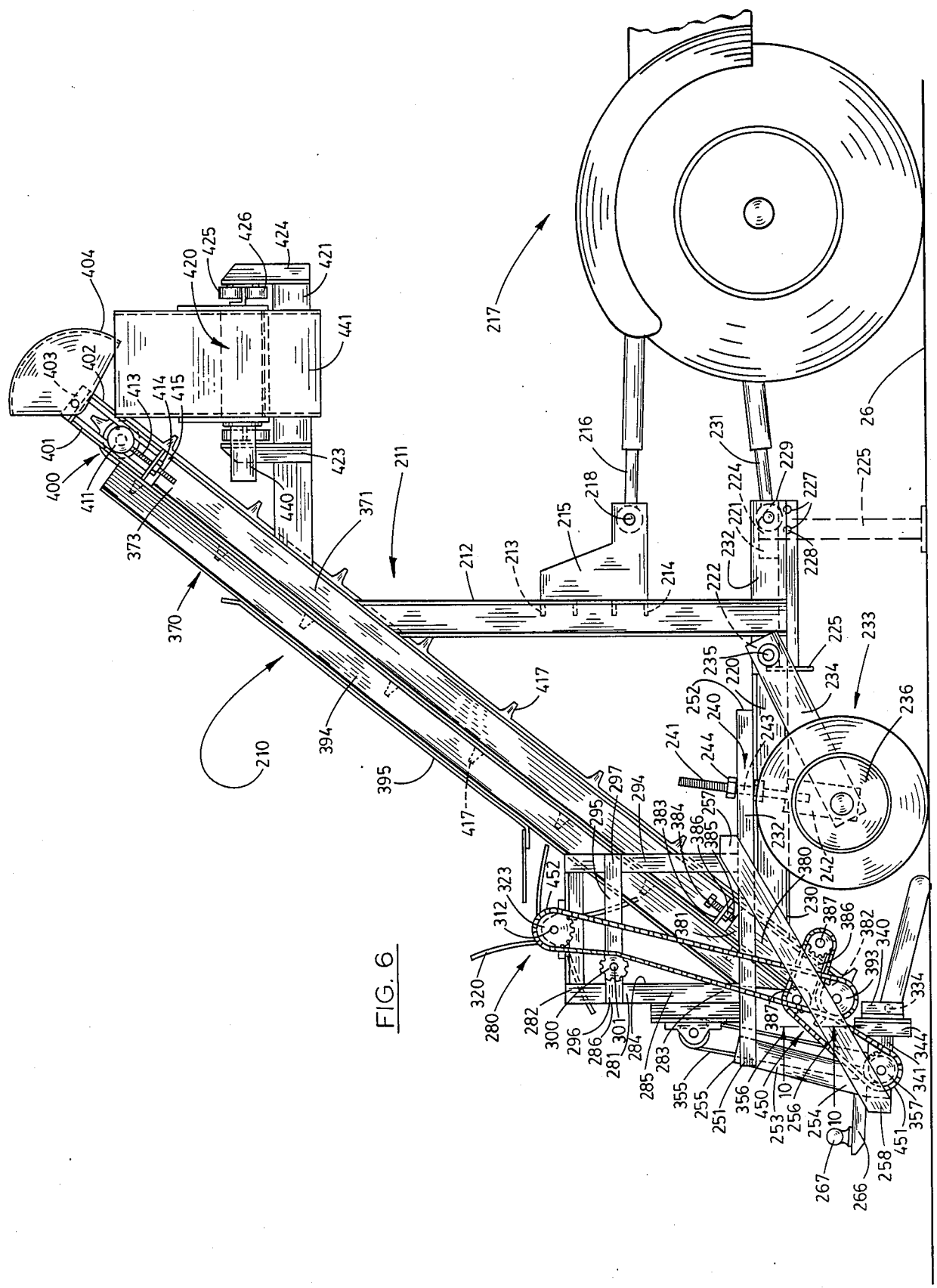
FIG. 6 is a side elevation of the second form of the apparatus of the present invention shown in a typical operative environment.

Referring more particularly to the drawings, the apparatus of the second form of the invention is generally indicated by the numeral 210 in FIG. 6. The apparatus 210 is shown in FIGS. 6 through 10. As will herein be discussed in greater detail, the apparatus 210 is also adapted for movement between adjoining rows of a row crop such as rows of grapevines, not shown. It should be understood that the apparatus 210 can be employed for harvesting a wide variety of different row crops that may be disposed on a continuous tray 55. Moreover, one skilled in the art should appreciate that the second form can be pulled by several different types of farm vehicles, and can, of course, be manufactured in a self-propelled configuration.

Figure 8:
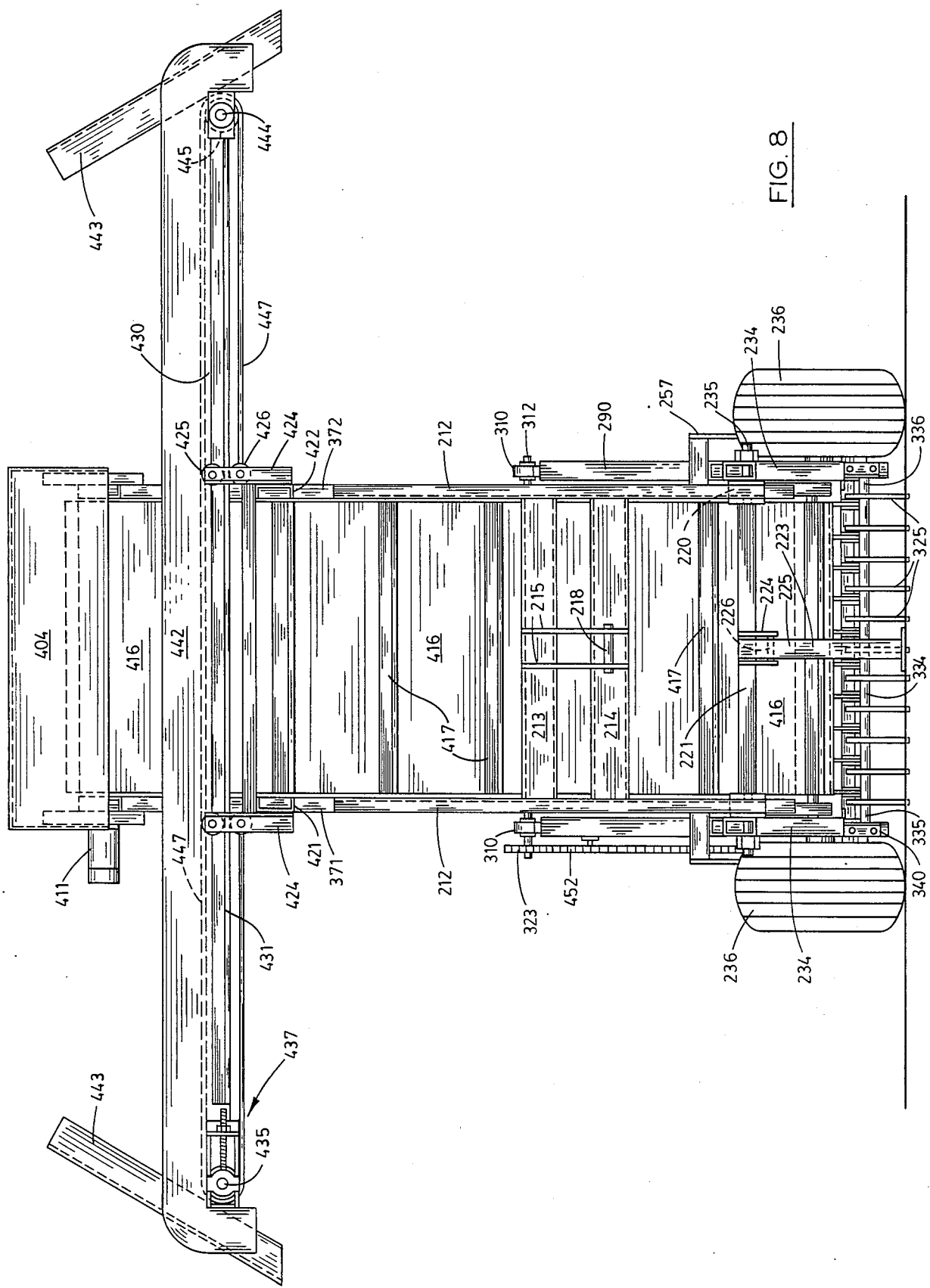
FIG. 8 is a front elevation of the second form of the subject invention.

The apparatus 210 has a main frame, or chassis, 211. The main frame or chassis has two vertical, substantially parallel support members 212, as best shown in FIGS. 6 and 8. The two vertical, substantially parallel support members are held in a fixed, spaced relationship by first and second horizontal bracing members 213 and 214, respectively, to which they are affixed by suitable welds. Positioned approximately midway along the length of the first and second horizontal bracing members, is a bracket member 215 which is adapted to receive the end of an appropriately dimensioned linking arm 216 extended from the rear of a tractor 217. The linking arm is pivotally attached to the bracket member by an appropriately dimensioned pivot pin 218.

The apparatus 210 has two horizontal, substantially parallel support members 220 individually mounted on the lower ends of support members 212 in fixed, spaced relationship and interconnected by first and second reinforcing beams 221 and 222, respectively. As best seen by reference to FIG. 8, the first reinforcing beam 221 has a leg assembly 223 mounted centrally thereon. The leg assembly 223 includes a mounting bracket 224, mounted on the first reinforcing beam 221, in which is mounted a leg 225 for pivotal movement about a pivot pin 226. As illustrated, the leg is dimensioned to hold the apparatus 210 upright when the apparatus is not connected to and thus supported by a towing vehicle, such as the tractor 217. A pair of orifices 227 are provided in the mounting bracket through which a pin 228 is selectively extended and through a corresponding orifice in the leg to maintain the leg in a fixed attitude such as shown in phantom lines in FIG. 6 in the lowered position or, alternatively, in the raised position, shown in full lines in FIG. 6.

The support members 220 have first ends 229 and opposite, second ends 230. The first ends of the support members are individually adapted to receive and hold for pivotal movement corresponding ends of linking arms 231 borne by the tractor 217. The linking arms constitute a standard three-point hitch subassembly, which is familiar to those skilled in the art. It should be understood that the three-point hitch system operates to deploy the apparatus in an appropriate operational attitude with respect to the earth's surface 26 over which it travels, so that the apparatus can achieve its intended objectives.

A horizontal hanger member 232 is mounted on each of the support members 220 extending parallel thereto, above and outwardly offset relative its respective support member.

Immediately rearwardly of the support members 212 on the support member 220 are mounted a pair of wheel assemblies 233 which serve as gauge wheels for the apparatus 210. The wheel assemblies each have a leg member 234 mounted for pivotal movement on its respective support member 220 at pivot point 235. Each leg member has a wheel 236 mounted for rotational movement at the remote end thereof. Each wheel assembly has a height adjustment assembly 240 interconnecting the remote end of its respective leg member and its hanger member 232, as best seen in FIG. 6. Each height adjustment assembly has a screw-threaded shaft 241 attached to the remote end of its leg member 234 by a plate 242 mounted thereon and extended upwardly through a suitable hole 243 in the hanger member 232. A nut 244 is screw-threadably secured on the screw-threaded shaft and bears downwardly on the top of the hanger member 232 to support the wheel assembly in the desired position. Similarly a nut 244 is screw-threadably secured on the screw-threaded shaft beneath the hanger member 232 against which the hanger member bears in use. The height of the wheels 236 is set using the height adjustment assemblies 240 to set the depth of penetration of the tongues 325 into the earth surface 26.

The apparatus 210 has a pair of vertical hanger members 253 each having a first end 254 and an opposite second end 255. The second end of the vertical hanger member is welded to the first end of the horizontal hanger member. A diagonal hanger member 256, which has a first end 257 and an opposed, second end 258, is mounted by its first end 257 on each of the horizontal hanger members 232. The diagonal hanger members extend downwardly and rearwardly to their second ends 258 which are interconnected by a tow bar member 260.

The tow bar member 260 has a first end 261 and an opposed second end 262. The tow bar member also has an inside surface 263, a top surface 264 and a central portion 265. As can best be seen by reference to FIG. 7, a hitch 266 is welded in the central portion 265 of the tow bar member. The hitch has a suitable ball 267, which is familiar to those skilled in the art. The hitch is employed in some instances for towing another vehicle, such as a trailer, behind the apparatus 210 in use.

A hanger reinforcement member 270 is mounted on and interconnects the vertical hanger members 253. As best illustrated by reference to FIG. 9, the hanger reinforcement member is attached by a suitable weld to the first end 254 of the vertical hanger members. The hanger reinforcement member has a first end 271 and an opposed, second end 272. Furthermore, the hanger reinforcement member has a top surface 273 and an inside surface 274. As is illustrated clearly by reference to FIG. 9, the hitch 266 is welded, in part, to the top surface of the hanger reinforcement member. The hanger reinforcement member is welded along its inside surface to the inside surface 263 of the tow bar member 260. It should be appreciated after a close study of FIG. 7 that the structural arrangement, as illustrated, comprising the horizontal hanger members 232, the vertical hanger members 253, the diagonal hanger members 256, the tow bar member 260 and the hanger reinforcement member 270 provide a rigid framework on which the other components of the apparatus 210 are mounted.

Mounted on the horizontal hanger members 232 are a rotatable tray deflector mechanism generally indicated by the numeral 280. The tray deflector mechanism has a pair of first vertical frame members 281. Each first vertical frame member has a first end 282 and an opposed, second end 283, which is mounted in upstanding relation on one of the horizontal frame members 232. Each first vertical frame member has an inside surface 284, an external surface 285, and an outside surface 286. The tray deflector mechanism has a pair of second vertical frame members 290. Similarly, each second vertical frame member has a first end 291 and an opposed, second end 292, which is mounted in upstanding relation on one of the horizontal hanger members 232. Similarly, each second vertical frame member, in like fashion, has an inside surface 293 and an external surface 294. Welded on the external surface 294 and the external surface 285 of the first and second vertical frame members, respectively, of each horizontal hanger member is a sprocket support member 295. As shown in FIG. 6, the sprocket support member has a first end 296 which is welded to the first vertical frame member and an opposed, second end 297, which is welded to the second vertical frame member.

Closely adjacent to the first end 296 of each sprocket support member 295 is an adjustment sprocket 300. The adjustment sprocket is attached to the sprocket support member and is adapted for rotational movement about a sprocket axle 301. Mounted on the first end 282 of the first vertical frame member 281 and the first end 291 of the second vertical frame member 290 of each horizontal hanger member 232 is a deflector support 302. As best depicted in FIG. 9, each deflector support is mounted on the inside surface 284 of the first vertical frame member and the inside surface 293 of the second vertical frame member. The deflector support has a first end 303, a second end 304, a top surface 305, and a central portion 306. A bearing housing 310 is affixed to the top surface, at approximately the central portion of each deflector support. The bearing housing is adapted to receive and closely hold a bearing 311. An axle 312, having a first end 313 and an opposed, second end 314, is mounted for rotational movement about its longitudinal axis in the bearings, as can best be seen in FIG. 7.

Four plates or wings 315 are mounted on the axle 312 deployed approximately 90° apart one from another about the axle. The wings have predefined surfaces 316 on which are mounted and from which are extended flexible deflector wands 320. The deflector wands each have a remote first end 321 and an opposed, proximal second end 322 which is attached to its respective wing. A deflector sprocket 323 is mounted on the first end 313 of the axle 312.

As best illustrated in FIG. 9, the apparatus 210 has an elevator ramp 324. The elevator ramp is composed of a plurality of elevator tongues 325. The elevator ramp functions as a first conveyor for the apparatus 210. The elevator tongues define a supporting surface 331 and have first ends 332 and opposed, second ends 333. The tongues are mounted in substantially parallel relation on a support or reinforcement member 334. Each tongue is welded on the reinforcement member so that the tongues are held in substantially fixed, spaced relationship one from another. As best seen by reference to FIG. 8, the reinforcement member 334 has a first end 335 and an opposed second end 336. Affixed on the first and second ends of the reinforcement member are attachment brackets 340 which are, in turn, individually mounted in depending relation on the first ends 254 of the vertical hanger members 253, as will hereinafter be described.

As shown in FIG. 9, the apparatus 210 has a pair of pulley support members 341, each having a first end 342 and an opposed, second end 43. Mounted on the first end 342 is a reinforcement bracket 344. The attachment brackets 340 of the elevator ramp 324 are individually mounted on the reinforcement brackets 344. Thus, a rigid framework is provided for the apparatus 210 from which the elevator ramp tongues 325 are deployed. The second ends of the pulley support members are individually mounted on the hanger reinforcement member 270.

Extending therethrough the pulley support members 341 is a pulley axle 345. As best seen by reference to FIG. 7, the pulley axle has a first end 350 and an opposed, second end 351. A bearing housing 352, enclosing a bearing 353, is mounted on each of the support members 341 individually mounting the first and second ends of the pulley axle for rotational movement about its longitudinal axis. Mounted in predetermined, fixed, spaced relationship along the longitudinal axis of the pulley axle are a plurality of single seat pulleys 354. As is best illustrated by reference to FIG. 7, a corresponding number of V-belts 355 are deployed about these single seat pulleys. The V-belts, it should be understood, provide a second supporting surface 356, on which the continuous tray 55 will subsequently travel. Mounted on the first end 350 of the pulley axle 345 outwardly of the bearing 353 is a drive sprocket 357. The drive sprocket is disposed in the same plane as the deflector sprocket 323.

The elevator ramp 324 is thus mounted on the chassis 211 and is advantageously deployed for tray-receiving engagement. The V-belts 355 are similarly deployed in receiving relation to the elevator ramp. The V-belts are disposed at an angle to the elevator ramp of approximately 90°. The apparatus 210 has a pair of pulley brackets 360, which are individually mounted on the outside surfaces 286 of the first vertical frame members 281. As best seen by reference to FIG. 9, each pulley bracket has a top surface 361 on which is mounted a bearing housing 362. The bearing housings are adapted to receive and hold for rotational movement an axle 363 having a first end 364 and a second end 365. Mounted on the axle, in fixed, spaced relationship, are a plurality of single seat pulleys 366, which are adapted to receive the upper ends of the V-belts 355. Corresponding pulleys 354 and 366 are substantially aligned to provide a path of travel for the V-belts which are deployed about them.

The apparatus 210 has an elevator conveyor 370 which is mounted to the chassis 211. The elevator conveyor is deployed in crop-receiving relationship with the elevator ramp 324 and the V-belts 355. The elevator conveyor has a first structural frame member 371 and a spaced substantially parallel second structural frame member 372. The frame members 371 and 372 are mounted on the free ends of the support members 212 and 220 on opposite sides of the apparatus 210 and extend upwardly at the angle shown in FIG. 6. As best illustrated by reference to FIGS. 6 and 9, the elevator conveyor has a first end 373 and an opposed, second end 374.

As best seen by reference to FIG. 6, the elevator conveyor 370 has a pair of first conveyor adjustment assemblies 380 individual to the frame members 371 and 372 and located in close proximity to the second end 374 of the elevator conveyor 370. The first adjustment assemblies of each frame member has a first end 381 and an opposed, second end 382. Welded on each first structural frame member is an adjuster bracket 383. An orifice, which is not shown, extends therethrough the adjuster bracket and is screw-threadably dimensioned to receive a screwthreaded bolt 384. The bolt is welded on the first end of the first adjustment assembly. A lock nut 385 is screw-threadably received on the bolt between the adjuster bracket 383 and the adjustment assembly. The bolts 384 are employed to adjust the first conveyor adjustment assemblies endwardly for purposes hereinafter to be described. Such adjustment is accomplished by screw-threadably adjusting the bolts in their respective orifices and, once the adjustment assemblies are in the desired positions, tightening the nuts on the bolts against the adjuster brackets to lock the bolts in position. A mounting plate 386 is borne by the adjustment assembly 380 visible in FIG. 6 and mounts a pair of idler sprockets 387 for rotational movement in the same plane as sprockets 323 and 357.

The first conveyor adjustment assemblies 380 are interconnected by an axle 390 mounting a roller 391 for rotational movement. The axle has a first end 392 visible in FIG. 7. The first end of the axle mounts two conveyor belt sprockets 393. As shown in FIG. 10, the conveyor belt sprockets are deployed side-by-side on the first end of the axle.

Figure 7:
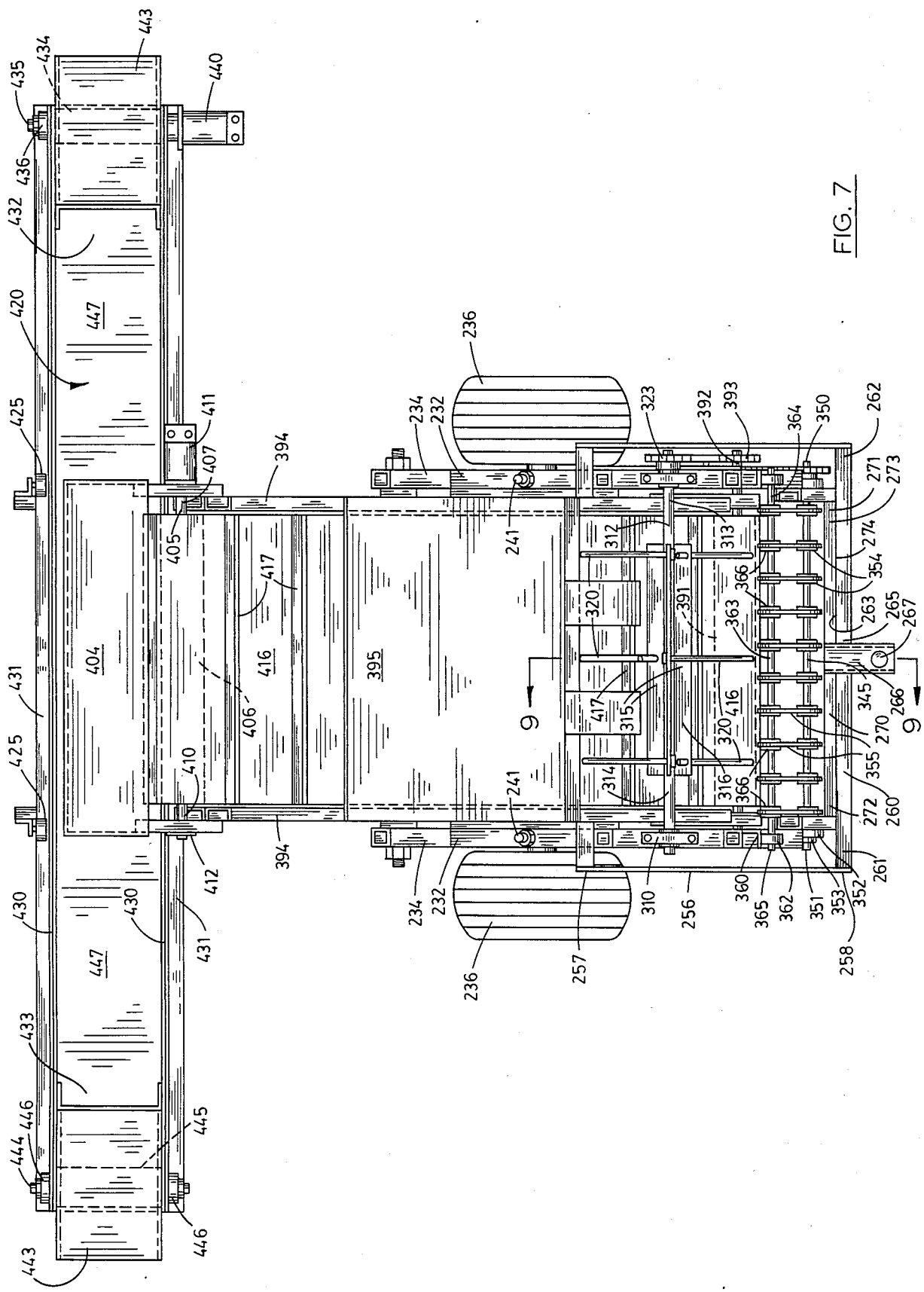
FIG. 7 is a top plan view of the second form of the subject invention.

The elevator conveyor 370 has a pair of conveyor walls 394 individually mounted on the first and second frame members 371 and 372. The conveyor walls are of a predetermined dimension adapted laterally to confine the crop which is transported by the elevating conveyor. Attached to the conveyor wall and providing a top for the elevating conveyor is a conveyor cover 395, as best shown in FIG. 7. It should be understood that the conveyor belt cover is utilized to protect and to confine the crop transported on the elevator conveyor.

Individually mounted on the first and second frame members 371 and 372 in close proximity to the first end 373 of the elevator conveyor 370 are second conveyor adjustment assemblies 400. As best shown in FIG. 6, each second conveyor adjustment assembly has a first frame member 401, a second frame member 402, and a third member 403. As should be understood, the first, second and third frame members are suitably welded together to provide a rigid frame. Attached on the third frame member, and deployed in a suitable, preselected attitude, is a crop deflector 404. The crop deflector deflects the crop being harvested in a downward direction. Moreover, the crop deflector is employed to prevent the wind from acting upon the crop as it falls from the first end 373 of the elevator conveyor.

The elevator conveyor 370 has an axle 405 which is suitably positioned about its first end 373, and is best illustrated by reference to FIG. 7. As should be understood, the instant axle is adapted to receive a roller 406, which is illustrated employing the use of phantom lines. The axle has a first end 407 and an opposed, second end 410. As should be revealed by a study of FIG. 7, the first end 407 of the axle 405 is connected in driven relation to an hydraulic motor 411 which is mounted on the second conveyor adjustment assembly visible in FIG. 6. The ends of the axle 405 are mounted for rotational movement in bearing housings 412 mounted in the frames formed by members 401, 402 and 403 so that the rollers 391 and 406 are individually mounted for rotational movement about substantially parallel axes of rotation. The bearing housings 412 are slidable in the frames formed by the members 401, 402 and 403.

As is clearly illustrated in FIG. 6, a screw-threaded rod 413 is pivotally attached to the bearing housing 412 of each conveyor adjustment assembly 400. Each rod 413 is screw-threadably extended through an adjuster bracket 415 which is welded on their respective first and second structural frame members 371 and 372.

A conveyor belt 416 is extended about the rollers 391 and 406 for driven movement thereabout. The conveyor belt has a plurality of transversely extending belt cleats 417 defining compartments 418 between adjoining cleats.

Mounted on the chassis 211 in horizontal crop-receiving relation to the first end 373 of the elevator conveyor 370 is a cross-row conveyor 420. As best shown in FIG. 7, the cross-row conveyor is adapted to receive and move the dislodged crop to a position where it will be collected in appropriate receptacles such as bins or gondolas. The cross-row conveyor is mounted in position by a first, horizontal support member 421 and a second horizontal support member 422, which are individually welded to the first structural frame member 371 and second structural frame member 372, respectively. A first vertical support 423 and a second vertical support 424 are mounted on both the first and second horizontal support members and each mounts a top roller 425 and a correspondingly opposed bottom roller 426. The top and bottom rollers are spaced a predetermined relatively short distance apart.

The cross-row conveyor 420 has two structural frame members 430 individually mounting angle iron guide members 431. As should be appreciated from a study of FIG. 6, the angle iron guide members are received between the top and bottom rollers 425 and 426, respectively on their respective sides of the cross-row conveyor permitting the cross-row conveyor to be adjusted, either to the right or to the left, by hand in the rollers. This adjustment allows the operator to permit the crop to be delivered across an adjoining row on either side of the apparatus for collection in appropriate receptacles. The cross-row conveyor has a first end 432 and an opposed, second end 433. Located adjacent to the first end of the cross-row conveyor is a roller 434, as best seen in FIG. 7 by the use of phantom lines. The roller is mounted for rotational movement with an axle 435 which is mounted in bearing housings 436. As best seen in FIG. 8, the cross-row conveyor has a pair of conveyor belt adjustment assemblies 437 which operate in a manner similar to that of the second conveyor adjustment assemblies 400.

Mounted on the cross-row conveyor in driving relation to the axle 435 and adjacent to the first end 432 of the cross-row conveyor 420 is a hydraulic motor 440. The hydraulic motor is connected to a suitable hydraulic system, not shown, which can be operated to cause the cross-row conveyor to deliver a crop deposited thereon to either the left or the right as viewed in FIG. 7. Such operation of the hydraulic motor permits the crop disposed onto the cross-row conveyor to be delivered either to the right or to the left over an adjoining row and thereafter be collected in a receptacle. The cross-row conveyor has walls 442 which confine and direct the crop that is disposed thereon to the ends of the cross-row conveyor. Located in fixed, spaced relation to the first end 432 of the cross-row conveyor 420 is a crop deflector 443. The crop deflector causes the crop disposed on the cross-row conveyor to be deflected in a downward direction and confined so that substantially all of the crop is received in the receptacle.

Located adjacent to the second end 433 of the cross-row conveyor 420, an axle 444 mounting a roller 445, illustrated in phantom lines, is mounted for rotational movement in a pair of bearing housings 446 individually mounted on the frame members 430. Mounted on the second end of the cross-row conveyor is a crop deflector 445 of similar design and purpose to that of crop deflector 443.

A conveyor belt 447 is extended about the rollers 434 and 443 and driven, at the selection of the operator using the hydraulic system not shown, either clockwise or counterclockwise by the hydraulic motor 440.

A chain or linkage mechanism is generally indicated by the numeral 450 in FIG. 6. The linkage mechanism includes a first chain 451 extending about the drive sprocket 357, the two directional sprockets 387 and the inside sprocket of the pair of conveyor belt sprockets 393. Upon actuation of the hydraulic motor 411, the conveyor belt 416 is caused to rotate in a clockwise fashion, as shown in FIG. 6. As this rotation occurs, the conveyor belt sprockets 393 are caused to rotate in similar clockwise directions. The movement of the conveyor belt sprockets drives the first chain in a counterclockwise direction. This movement of the inside conveyor belt sprocket additionally drives the V-belts 355 in a counterclockwise direction. Similarly, the clockwise rotation of the outside conveyor belt sprocket 393 causes a second chain 452 to move in a clockwise direction, as shown in FIG. 6. The second chain is operably extended about the outside conveyor belt sprocket 393, the adjustment sprocket 300 and the deflector sprocket 323 as shown in FIG. 6. Therefore, the movement of the elevator conveyor 370 causes the tray deflector mechanism 280 to move in a clockwise direction. It should be apparent from a study of FIG. 9 that such movement of the tray deflector mechanism urges the continuous tray 55 away from the elevator conveyor 370 after it has cleared the end of the V-belts 355.

OPERATION

Second Form

The operation of the described embodiment of the apparatus 210 is believed readily apparent and is briefly summarized at this point.

The apparatus 210, which is specifically adapted for separating a crop from a continuous tray 55, is best understood by reference to FIG. 9. As shown therein, an elevator ramp 324 is deployed in a predetermined operational attitude and which defines a supporting surface 331 for transportation of the continuous tray thereon. Once the wheel assemblies 233 have been adjusted as described to act as gauge wheels for the tongues 325, the depth of penetration of the ends of the tongues into the earth surface 26 corresponds to the vertical distance between the bottoms of the wheels 236 and the ends of the tongues. The apparatus is placed in this position using the three-point hitch of the tractor 217. This results in the apparatus 210 being placed in the attitude shown in FIG. 6.

The tractor 217 is then driven down the path between adjoining rows of, in this instance, grapevines and the tractor is driven over the end of the continuous tray 55 bearing the crop to be collected. The wheels of the tractor and the wheel assemblies 233 of the apparatus pass on opposite sides of the continuous tray as the tractor and apparatus themselves pass over the continuous tray. When the elevator tongues 325 come into contact with the continuous tray, they slide under the tray and the tray with the crop disposed thereon, move up the supporting surface 331 of the elevator ramp 324 into a first attitude and into contact with the supporting surface 356 of the V-belts 355. Continuing to move with the V-belts 355, the continuous tray is simultaneously lifted and inverted thus placing the continuous tray in a second attitude. As previously discussed, the tray in movement from the first attitude on the elevator to the second attitude on the V-belts changes in attitude about 90°. However, as can be seen in FIG. 9, the change in attitude relative to the earth surface is approximately 110°. The inversion of the tray by approximately 110° relative to the earth surface causes the crop disposed thereon to become dislodged from the tray.

An elevating conveyor 370 is mounted on the chassis 211 in crop-receiving relation to the elevator ramp 324 and the V-belts 355. The crop, which falls from the continuous tray, is collected in compartments 418 of the conveyor belt 416 between the cleats 417. As can be visualized upon reference to FIG. 9, the cleats are positioned to pass in close proximity to the tray to dislodge any of the crop adhering thereto. Similarly, any of the crop falling between the tray and the lower end of the elevator conveyor 370 is retrieved by the cleats passing therebetween and carried onto the conveyor belt.

As the V-belts 355 continue to transport the continuous tray 55 that has been cleaned of its crop, the tray moves into contact with the rotatable tray deflector mechanism 280. As illustrated most clearly in FIG. 9, the deflector wands 320 of the deflector mechanism strike the end of the tray and cause it to be moved away from the elevator conveyor 370, back over the top of the V-belts 355 and into trailing relation to the apparatus 210. The tray is thus prevented from lying on top of the elevating conveyor 370 or otherwise interfering with the operation of the apparatus. Once the continuous tray has been so threaded through the apparatus 210, the weight and drag of the tray usually retains the tray following the path shown in FIG. 9. The self threading operation described thus only takes place at the beginning of a new tray at the beginning of a new row.

The crop deposited on the elevator conveyor is carried therealong to its first end 373. Upon reaching the first end of the elevator conveyor, the collected crop falls onto the cross-row conveyor 420. As earlier discussed, the cross-row conveyor, having been adjusted to an attitude either to the left or to the right side of the path of travel of the apparatus, delivers the crop received from the elevator conveyor across the adjacent row and discharges the crop into receptacles such as bins or gondolas, not shown.

Therefore, the apparatus for separating a crop from a continuous tray of both forms of the present invention can be manufactured, purchased and operated at comparatively moderate prices well within the reach of even small farming operations while operating automatically and dependably to self feed the continuous tray from which the crop is to be collected therethrough at the beginning of a row and thereafter to collect the crop therefrom in a dependable, economical and efficient manner.

Although the invention has been shown and described herein in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. An apparatus for separating a crop from an elongated continuous tray rested in a substantially horizontal attitude on the earth's surface and bearing said crop in rested relation thereon, the apparatus comprising:
   A. a frame adapted to be mounted on a vehicle adapted for earth traversing movement along said continuous tray with said crop rested thereon;
   B. a first conveyor mounted on the frame in an attitude disposed for movement between the continuous tray and the earth's surface during said earth traversing movement of the vehicle to carry said continuous tray therealong in movement relative to the frame;
   C. a second conveyor mounted on the frame rearwardly of said first conveyor with respect to the direction of said earth traversing movement and in an attitude for engaging the continuous tray and directing said continuous tray in said relative movement to an attitude over vertical toward itself to dislodge said crop therefrom; and D. a third conveyor mounted on the frame having a portion disposed between said first conveyor and said second conveyor and in position for gravitationally receiving said crop dislodged from the continuous tray and operable to transport said dislodged crop for collection.

2. The apparatus of claim 1 wherein the first conveyor has a plurality of continuous belts mounted for rotational movement and individually having corresponding runs disposed in spaced, substantially parallel relation substantially aligned with said direction of the earth traversing movement to define a supporting surface for the continuous tray and means for driving said belts in said rotational movement to carry said runs in said direction of relative movement of the continuous tray to transport the continuous tray along the supporting surface.

3. The apparatus of claim 1 wherein the first conveyor mounts a ramp for sliding beneath the continuous tray to feed said continuous tray on to the first conveyor.

4. The apparatus of claim 2 wherein the second conveyor has a plurality of continuous belts mounted for rotational movement and individually having corresponding runs disposed in spaced, substantially parallel relation and means for driving said belts along corresponding paths for directing the continuous tray in said relative movement over vertical toward itself to dislodge the crop therefrom.

5. The apparatus of claim 4 wherein the continuous tray while being directed by the second conveyor travels along an over vertical path overhanging a portion of the continuous tray.

6. The apparatus of claim 4 wherein the continuous belts of said first and second conveyors are extended about and driven from a common axle.

7. The apparatus of claim 4 wherein said continuous tray is moved substantially 110° in being moved from the first conveyor and into said over vertical attitude by the second conveyor.

8. The apparatus of claim 2 or 3 wherein the third conveyor mounts a plurality of cleats thereon individually extending outwardly from the third conveyor gravitationally to collect the crop dislodged from the continuous tray and passing with said third conveyor sufficiently close to said continuous tray to wipe any of said crop adhering thereto from the continuous tray.

9. The apparatus of claim 2 wherein the first conveyor individually mounts a pair of idler pulleys at the lateral edges of the first conveyor individually in engagement with the lateral most continuous belts of the first conveyor and elevated to lift said runs thereof and thereby the lateral edges of said continuous tray to confine the crop rested on said continuous tray substantially to the central portion of the continuous tray.

10. An apparatus for separating a crop from an elongated continuous tray rested in a substantially horizontal attitude on the earth's surface and bearing said crop in rested relation thereon, the apparatus comprising:
A. a chassis adapted to be mounted on a vehicle adapted for earth traversing movement in a predetermined direction of travel along said continuous tray;
B. a ramp mounted on the chassis and deployed for movement between the continuous tray and the earth's surface during said earth traversing movement of the vehicle to pass the continuous tray up the ramp;
C. a tray directing conveyor mounted on the chassis rearwardly of the ramp with respect to said direcion of travel and disposed in upstanding relation, said tray directing conveyor having a plurality of belts individually rotatably mounted on a plurality of pulleys which are mounted on the chassis so that the belts are individually rotational about corresponding pairs of said pulleys to carry corresponding runs of the belts along substantially parallel paths in an upward direction for engagement by the continuous tray passing up the ramp to urge the continuous tray to an over vertical attitude to dislodge the crop from the continuous tray;
D. an elevating conveyor mounted on the chassis adjacent to and above the ramp and having a portion thereof in close proximity to and in front of said over vertical attitude of the continuous tray to receive the crop dislodged therefrom and said elevating conveyor mounting a plurality of cleats extending from the elevating conveyor to positions to pass in close proximity to the continuous tray to dislodge any crops adhering to the continuous tray and said elevating conveyor having a crop discharging portion;
E. a cross-row conveyor mounted on the chassis in an attitude substantially transverse to said direction of travel of the vehicle and extending beneath the crop discharging portion of the elevating conveyor;
F. drive means borne by the chassis connected in driving relation to the elevating conveyor and the cross-row conveyor;
G. means linking the drive means and the tray directing conveyor for driving said tray directing conveyor; and
H. a deflector mechanism rotationally mounted on the chassis in driven relation above the tray directing conveyor in position to strike and thus urge the continuous tray to move rearwardly of the apparatus with respect to said direction of travel of the vehicle after separation of the crop from said tray.

11. The apparatus of claim 10 wherein the continuous tray is moved to a position over vertical which is substantially 110° from horizontal about a substantially horizontal axis transverse to a longitudinal axis of the continuous tray in being directed into said over vertical attitude.

12. The apparatus of claim 10 wherein said linking means includes a sprocket and chain assembly borne by the chassis interconnecting said drive means and the tray directing conveyor operable to rotate the tray directing conveyor at substantially the speed of relative movement of the continuous tray through the apparatus.

13. The apparatus of claim 12 wherein the deflector mechanism mounts a plurality of flexible, substantially radially extending wands and the sprocket and chain assembly of the linking means is connected in driving relation to said deflector mechanism to rotate the deflector mechanism and thus carry said wands against the continuous tray to urge the continuous tray rearwardly of the apparatus with respect to said direction of travel of the vehicle.

* * * * *

UNITED STATES PATENT AND TRADEMARK OFFICE
CERTIFICATE OF CORRECTION

PATENT NO. : 4,759,680
DATED : July 26, 1988
INVENTOR(S) : Leland S. Simpson, III It is certified that error appears in the above-identified patent and that said Letters Patent is hereby corrected as shown below:

Column 5, line 34, delete "heated" and substitute ---seated---.

Column 20, lines 5 and 6, delete "direcion" and substitute ---direction---.

Signed and Sealed this

Twenty-ninth Day of November, 1988

Attest:

DONALD J. QUIGG

*Attesting Officer*  *Commissioner of Patents and Trademarks*